(No Model.)
H. J. DAVIS & J. C. McDANIEL.
SPOKE SOCKET.
No. 529,716. Patented Nov. 27, 1894.
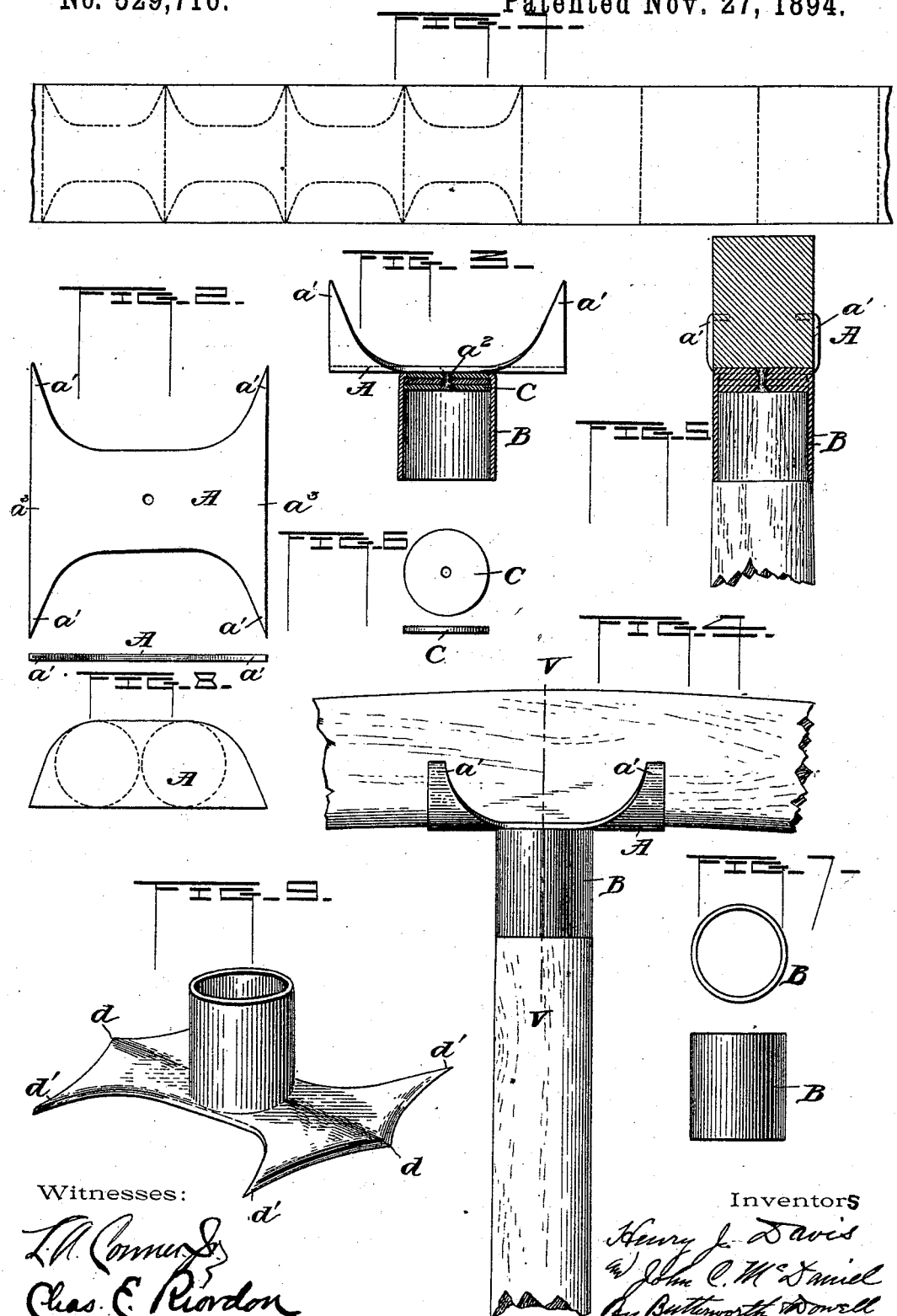
Witnesses:
Inventors
Henry J. Davis
John C. McDaniel
by Butterworth & Dowell
their Attorneys.

UNITED STATES PATENT OFFICE.

HENRY J. DAVIS AND JOHN C. McDANIEL, OF IRON CITY, ALABAMA.

SPOKE-SOCKET.

SPECIFICATION forming part of Letters Patent No. 529,716, dated November 27, 1894.

Application filed February 7, 1894. Serial No. 499,372. (No model.)

*To all whom it may concern:*

Be it known that we, HENRY J. DAVIS and JOHN C. McDANIEL, citizens of the United States, residing at Iron City, in the county of Calhoun and State of Alabama, have invented certain new and useful Improvements in a Combined Spoke-Socket and Bearing Plate; and we do hereby declare the following to be a full, clear, and exact description of the invention, such as will enable others skilled in the art to which it appertains, to make and use the same.

This invention relates to improvements in devices for repairing vehicle wheels, and more particularly the wheels of buggies, carriages, wagons, carts and other road vehicles.

The primary object of the invention is to provide a simple, inexpensive and efficient device for tightening loose spokes so as to prevent the same from rattling; the device being so constructed that it may be applied without removing the tire or felly and without weakening the latter by cutting away any portion thereof around the spoke socket.

A further object is to provide a combined spoke-socket and fastening plate composed of two parts which are rigidly joined together and adapted to secure a firm connection between the spoke and felly and which may be cheaply manufactured and sold at a small price, so as to reduce the cost of repairing the wheels to a minimum.

The invention will first be described with reference to the accompanying drawings, which forms a part of this specification, and then pointed out in the claim at the end of the description.

Referring to the drawings, Figure 1, is a diagram illustrating the method of cutting the fastening plates from a piece of sheet or band steel. Fig. 2, is a top and an edge view of one of such plates. Fig. 3, is a side view of the fastening plate attached to the spoke socket; the latter being shown in section. Fig. 4 is a side view of the combined socket and fastening plate attached to a spoke and felly. Fig. 5 is a sectional view taken on line V—V of Fig. 4. Fig. 6 is a detail showing a top and an edge view of one of the buttons. Fig. 7 is an end and a side view of the socket; and Fig. 8 is a diagram illustrating the method of cutting the buttons or washers from a piece of scrap metal. Fig. 9 is a perspective view of a modified form of plate with spoke socket.

Similar letters of reference denote similar parts in the several views.

As the result of the usual wear and tear to which a vehicle is subjected in use the spokes soon become loose in the rim or felly sockets, permitting the felley to play or move up and down on the tenon of the spoke, and allowing the spoke to vibrate and produce a rattling disagreeable sound. To prevent rattling without putting in new spokes it is the common practice to remove and shrink the tire so that when replaced it will bind the spokes and felly more tightly together; but when this remedy is no longer effective, it becomes necessary to remove the bolts which secure the tire and rim, then remove both tire and rim and also the old spokes; substituting new spokes for the old ones, then replacing the felly, tire and bolts, which involves considerable time and expense.

Our object is to overcome the above mentioned difficulties and to provide means for making the loose spokes fast to the rim and tight without much waste of time and at very little expense. To this end we have devised a combined thimble or socket and fastening plate whereby the spokes may be easily and quickly made fast to the rim without removing either rim or tire.

In the drawings, A, denotes the fastening plate and B, the spoke-socket or thimble, preferably made separate and secured together as hereinafter described, but the plate may be formed integrally with the socket if desired. Our preferred method of constructing the plate and socket is illustrated in Figs. 1 to 8. In this case we cut from a piece or blank of sheet or band steel, a series of plates substantially of the form shown in Figs. 1 and 2, having a main oblong body portion $a$, and side portions or points $a'$, projecting from the opposite edges of the body $a$, at the ends of the plate. We then cut from the scrap metal, as indicated in Fig. 8, a series of disks or buttons C (Fig. 6) which may be about three-fourths of an inch in diameter, and perforate both the disks and plate centrally, as shown, to receive a stud or rivet $a^2$, for riveting the buttons to the plate. We then take a piece of piping, preferably of steel about one-sixteenth of an inch thick and cut the same into suitable lengths usually about seven-eighths of an inch, to form thimbles or sockets adapted to fit over the ends of the spokes. The sockets may be of any desired length. We then place one of the thimbles over or around one or more buttons, previously riveted to the plate, the button next to the plate being of a slightly reduced diameter, and crimp or bind the end of the thimble inward toward the smaller button and around the edges of the larger or outer button, and thereupon forge, solder or braze the several parts together, thereby firmly securing the parts and making practically an integral combined spoke-socket and fastening plate.

In the manufacture of this device the best soft tough band steel and the best tough steel piping are preferred, but, of course, any suitable metal may be employed. The socket and plate may also be cast integral and may be made of malleable iron, brass, German silver, or any other suitable material.

To economize in the use of material the metallic strip or blank out of which the bearing plates are cut or stamped, is preferably cut straight across at suitable intervals, as indicated in Fig. 1, so that the plates will have straight edges $a^3$, $a^3$, but when cast or otherwise formed the ends of the plate may be formed with pointed extensions $d$, $d$, as indicated in Fig. 9, to increase the bearing surface for the felly and give additional strength. In the modification (Fig. 9.) as will be observed the portions of the plate at either side of the spoke-socket, if cut off, would form an approximately diamond shaped figure; the longer points $d'$, extending transversely of the main body of the oblong plate and the shorter projection or point $d$, extending in the plane thereof and having a centrally disposed ridge or increased thickness of the metal between the two lateral points $d'$, $d'$, to afford additional strength.

The socket in either construction is open at one end only to receive the spoke, and closed at the other (by the plate, and the interposed disks when the latter are used) and the thickness of metal formed by said plate and disks is interposed between the rim or felly and the end of the spoke to compensate for the slight shortening of the spoke by sawing off its tenon, and when the parts are properly joined together the spoke is not liable to become loose again until the wheel is practically worn out. It will also be observed that the oblong or main portion $a$, of the bearing plate is of the same width as the felly, so that the usual square-cornered portion of the felly about the tenon socket, necessary to give additional strength at this point, need not be weakened by cutting away or rounding off the edges of the felly at this point, which would necessarily weaken and impair the efficiency of the device. Furthermore, the concave formation of the cut away portion at either side of the plate dispenses with metal where strength is not required and gives the desired strength where it is most needed without waste of material, and obviates the objection which would obtain if the central portion of the plate between the points $a'$, $a'$, were also bent up or curved around the felly, owing to its liability to permit sand, dust or gravel to work in behind the plate and bulge or force the same outward until the points $a'$, entirely lose their hold upon the felly.

In use the loose spoke is first sawed off close to the rim and then drawn out to one side of the rim to permit the socket and plate to be placed thereon. The end of the spoke is then inserted in the socket and the felly slightly raised or sprung away from the spoke sufficiently to permit the plate to pass underneath the felly and thereupon the pointed ends or projections $a'$, of the plate are turned inward and driven into the side of the felly so as to prevent the plate from moving in any direction.

The devices may be constructed in different sizes to fit different vehicles, and may be placed on sale in any hardware store, at which they may be procured and applied by any person of ordinary intelligence without necessitating a trip to a repair shop. We thus place within reach of men who are not mechanics or used to repairing vehicles and farmers not within easy reach of a repair shop, the means whereby a wheel with loose spokes may be easily, quickly and cheaply repaired without requiring the services of a wheelwright.

Having thus fully described our invention, what we claim as new, and desire to secure by Letters Patent of the United States, is—

A device for repairing vehicle wheels, consisting of a spoke-socket or thimble open at one end to receive the tenon of a spoke and having its other end extending inwardly to engage a small button, together with a larger button arranged below the smaller button and within the socket or thimble, a flat oblong plate arranged above the small button and the inwardly extending portion of the thimble, and means for securing the thimble, buttons and oblong plate rigidly together; the said oblong plate having pointed lateral projections or extensions at either side thereof on opposite sides of the thimble or socket, said plate being of a width between said lateral extensions corresponding with the width of the felly about the tenon socket, whereby it is adapted to afford an extended bearing or seat for the felly without rounding off or cutting away the latter at this point, while said lateral extensions are turned upward and driven into the sides of the felly, substantially as described.

In testimony whereof we affix our signatures in presence of two witnesses.

HENRY J. DAVIS.
JOHN C. McDANIEL.

Witnesses:
J. A. SCOTT,
OCO DE ARMAN.